United States Patent
Yang (10) Patent No.: US 7,130,349 B1
(45) Date of Patent: Oct. 31, 2006

(54) METHOD AND APPARATUS TO IMPROVE EFFICIENCY IN MULTIPLE-PASS, BIT-RATE-CONTROLLED FRAME ENCODING

(75) Inventor: Liuyang Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 247 days.

(21) Appl. No.: 09/116,147

(22) Filed: Jul. 16, 1998

(51) Int. Cl.
*H04N 7/12* (2006.01)

(52) U.S. Cl. .................................. 375/240.07

(58) Field of Classification Search ........... 375/240.01, 375/240.02, 240.1, 240.16, 240.07; 382/232, 382/239; H04N 7/12
See application file for complete search history.

(56) References Cited

U.S. PATENT DOCUMENTS 6,148,026 A * 11/2000 Puri et al. .............. 375/240.16

* cited by examiner

*Primary Examiner*—Young Lee
(74) *Attorney, Agent, or Firm*—Alan L. Pedersen-Giles (57) ABSTRACT

Video image data is commonly encoded using a video encoder operating under the control of a bit-rate controller where a plurality of encoding passes are performed so as to improve quality in each video frame. According to an embodiment of the present invention, a systematic review of the steps and sub-steps of the encoding passes is performed so as to identify those sub-steps which are necessary and those that are unnecessary to the execution of the encoding passes. Then, those steps identified as being necessary are executed during the encoding passes. Doing so reduces the amount of processor computation that is needed to perform a given number of encoding passes allowing the passes to be performed quicker or at a greater rate, thus improving quality.

25 Claims, 8 Drawing Sheets

| STEPS → | Wavelet Decomp. | Motion Estimation | Difference Image Encoding | Difference Image Decoding | Motion Compensation | Wavelet Recomp |
|---|---|---|---|---|---|---|
| Initial-trial encoding pass | X | X | X | ? | | |
| Retrial encoding pass | | | ? | ? | | |
| Final encoding pass | | | ? | X | X | X |

| First Order Sub-Steps → | Calculate Average Activity | Determine Adaptive Quant. Level | Forward Block Transform | Block Quantization | Zig-Zag run-length coding | Generate Bit Stream | Block De-quantization | Inverse Transform |
|---|---|---|---|---|---|---|---|---|
| Initial-trial encoding pass | X | X | X | X | X | X | DC Coeff. Only | |
| Retrial encoding pass | | X | | X | X | X | DC Coeff. Only | |
| Final encoding pass | | | | | | ? | X | X |

| Second Order Sub-Steps → | Generate GOP, Picture, and Band Header | Generate Tile and Below Bit Stream |
|---|---|---|
| Initial-trial encoding pass | X | X |
| Retrial encoding pass | X | X |
| Final encoding pass | X | |

| STEPS → | Wavelet Decomp. | Motion Estimation | Difference Image Encoding | Difference Image Decoding | Motion Compensation | Wavelet Recomp |
|---|---|---|---|---|---|---|
| Initial-trial encoding pass | X | X | X | ? | | |
| Retrial encoding pass | | | ? | ? | | |
| Final encoding pass | | | ? | X | X | X |

| First Order Sub-Steps → | Calculate Average Activity | Determine Adaptive Quant. Level | Forward Block Transform | Block Quantization | Zig-Zag run-length coding | Generate Bit Stream | Block De-quantization | Inverse Transform |
|---|---|---|---|---|---|---|---|---|
| Initial-trial encoding pass | X | X | X | X | X | X | DC Coeff. Only | |
| Retrial encoding pass | | X | | X | X | X | DC Coeff. Only | |
| Final encoding pass | | | | | | ? | X | X |

| Second Order Sub-Steps → | Generate GOP, Picture, and Band Header | Generate Tile and Below Bit Stream |
|---|---|---|
| Initial-trial encoding pass | X | X |
| Retrial encoding pass | X | X |
| Final encoding pass | X | |

METHOD AND APPARATUS TO IMPROVE EFFICIENCY IN MULTIPLE-PASS, BIT-RATE-CONTROLLED FRAME ENCODING

BACKGROUND OF THE INVENTION

The present invention pertains to a method and apparatus to improve efficiency in multiple-pass frame encoding. More particularly, the present invention pertains to a method and apparatus which reduces the number of processing steps that are taken to encode a frame in a multiple-pass, bit-rate-controlled frame encoding environment.

Video encoding is a known procedure in the art for converting video image data into a digital bitstream that can then be transferred to a transmission medium or a storage medium (e.g., a compact disc read only memory (CD-ROM)). For example, a camera can be provided that generates video image data for a video capture component. The video capture component "captures" the video image data from the camera one frame at a time in a known manner and at a predetermined rate (e.g., approximately 30 frames per second). The video capture component transfers the video frame data to a video compressor which may compress the video image data for the frame under the control of a bit rate controller. The video compressor typically includes a coder/decoder (codec) that compresses the video image data according to a compression algorithm (the compression step is often referred to as encoding). For codecs that are used in the transfer of video data over a transmission medium (e.g., telephone lines, the Internet, etc.), typical compression algorithms include any of a variety of block transform based algorithms such as H.261 (International Telecommunication Union—Telecommunications Standardization Sector (ITU-T), March, 1993), H.263 (ITU-T, Dec. 5, 1995), MPEG-I, and MPEG-II (International Organization for Standardization/International Electrotechnical Commission (ISO/IEC) 11172-2 and 13818-2).

In a rudimentary example of video compression, the video frame of data that is captured by the video capture component is encoded in a single pass. In other words, the compression algorithm is executed with one iteration to form a compressed bit stream. A problem that is seen with this type of compression is that the amount of data in the bit stream may exceed (or substantially undershoot) the allowable bandwidth for that information. For example, in a video telephone application transmission of 30 frames per second video over standard phone lines using a single pass compression algorithm may produce too much data to be handled by the phone lines. Also, if the compressed video stream is being stored to a storage medium (e.g., to a compact disc), single pass compression may produce a bit stream that exceeds the capacity of the storage medium. Alternatively, if the amount of data substantially undershoots the available bandwidth for that information, the quality of the video data is unnecessarily reduced.

One known procedure for controlling the size of the bit stream or more accurately, the bit rate (i.e., size of the bit stream per unit time) is to employ a bit rate controller. Almost all video compression algorithms include a quantization parameter that has an inverse proportional effect on the bit rate (i.e., an increase in the quantization parameter results in a lower bit rate and vice versa). Given a target bit rate, a bit rate controller causes the video compressor to perform several iterations (passes) of the compression algorithm with different quantization parameters to achieve the target bit rate. For example, the video compressor may perform an initial pass, where the compression algorithm is executed in its entirety with an initial quantization parameter. Based on the result, a second (or retrial) pass is performed where the compression algorithm is executed in its entirety with a new quantization parameter. Several retrial passes can be performed, modifying the quantization parameter each time, until the target bit rate is achieved (within a given tolerance). The video compressor will then perform a final pass with the final quantization parameter.

A problem that is seen with the multiple-pass compression using a bit rate controller is that it takes some time to perform all of the steps in each pass. Each pass includes a number of complex computational steps and sub-steps that take time to execute. In a videophone application, there may be insufficient time to perform a sufficient number of retrial passes to obtain the target bit rate. Also, when storing the compressed bit stream to a storage medium, it may take an excessive amount of time to perform as many retrial passes as needed to achieve the target bit rate.

In view of the above, there is a need for a method and apparatus that improves the efficiency of a multiple-pass video encoding operation.

SUMMARY OF THE INVENTION

According to an embodiment of the present invention, a system is provided for encoding video image data with at least first and second encoding passes. Each encoding pass includes a number of executable steps and at least one of the executable steps includes a number of executable first order sub-steps. First order sub-steps in at least one of the first and second encoding passes are identified as being necessary or unnecessary for execution of the encoding passes. Then, the necessary sub-steps are executed during the first and second encoding passes.

DETAILED DESCRIPTION

Figure 1:
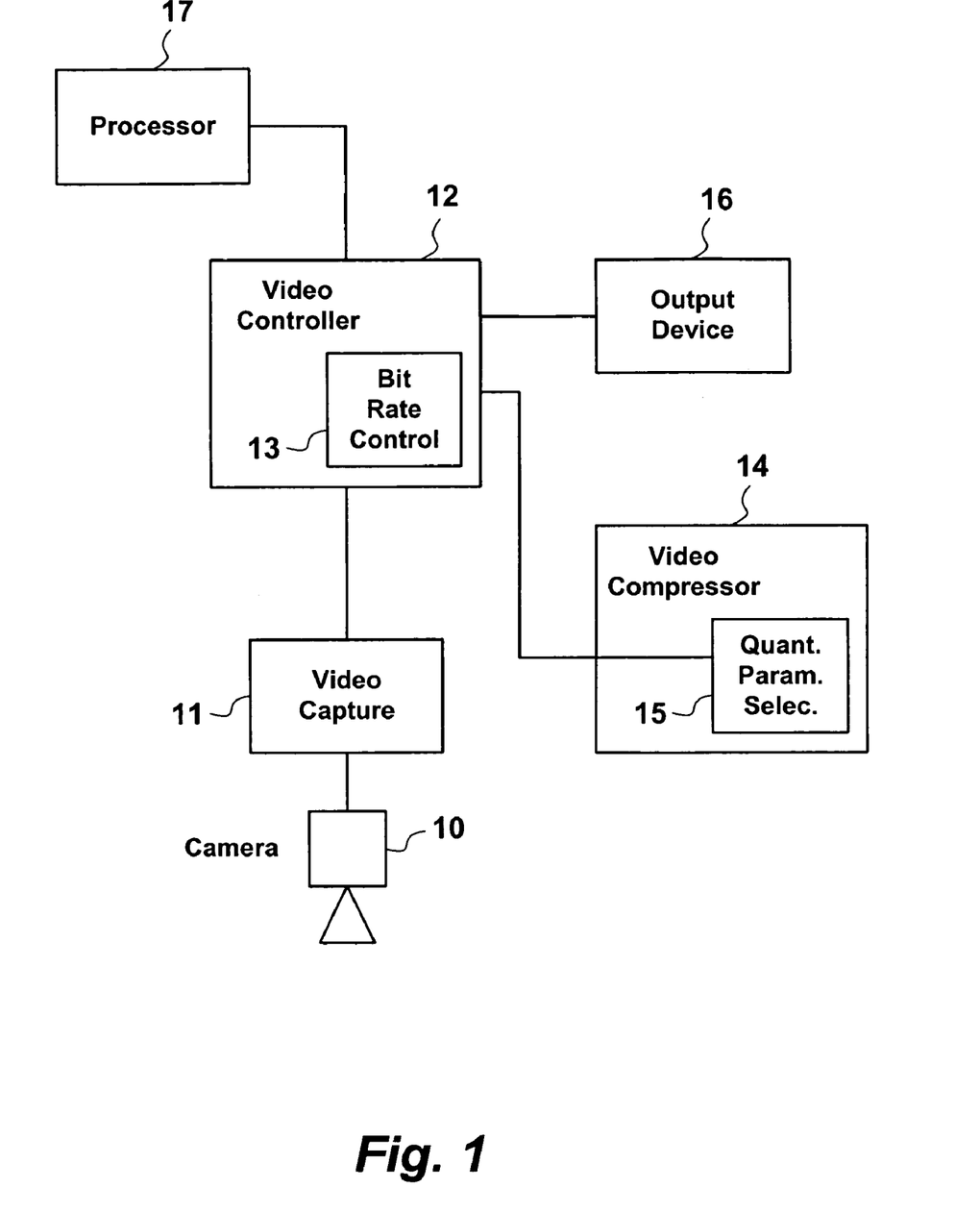
FIG. 1 is a block diagram of system operated according to an embodiment of the present invention.

Referring to FIG. 1, a general block diagram of an embodiment of the present invention is shown. In this embodiment, a camera 10 and a video capture component 11 are provided to generate a frame of video image data. One skilled in the art will appreciate that other devices are available for providing one or more frames of video data. Each frame of video data is provided to a video controller 12 which includes a bit rate controller 13. The uncompressed video frame data is sent to a video compressor 14 where it is compressed based upon a quantization parameter value (as described above) generated by a quantization parameter selector 15. The compressed video image data is sent back to the video controller 12, and the bit rate controller determines if the bit rate matches (or within a tolerance of) a target bit rate. Assuming that the bit rate needs to be modified, the uncompressed video data is re-sent to video compressor 14 for another pass with a new quantization parameter. The final compressed video image data is sent from video controller 12 to an output device 16 (e.g., a transmission or storage medium). A processor 17 (e.g., a Pentium® processor from Intel Corporation, Santa Clara, Calif.) may be provided to execute code to achieve the above-described functions.

Figure 2:
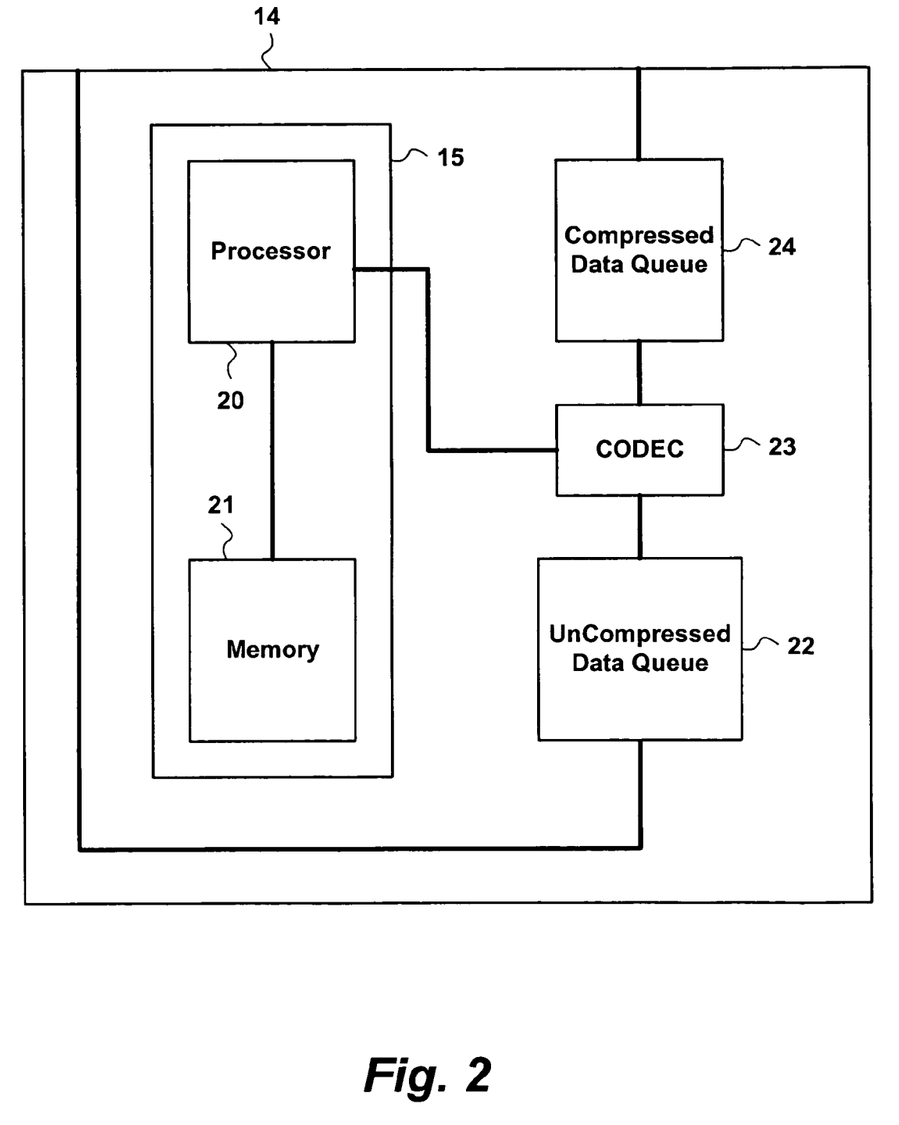
FIG. 2 is a block diagram of the video compressor of FIG. 1.

A block diagram of video compressor 14 is shown in FIG. 2. Uncompressed video image data is provided to an uncompressed data queue 22 and is then supplied to a codec 23 for the encoding operation. The encoding operation can be controlled by the quantization parameter selector 15 which may include a processor 20 coupled to a memory 21. The compressed video image data is transferred to a compressed data queue 24 and then to video controller 12 (FIG. 1).

In the present invention, video image data (e.g., in a frame) is encoded through the execution of an initial pass, one or more retrial passes and a final pass. Accordingly, a plurality of encoding passes are performed on the video image data. In this embodiment of the present invention, an initial pass in combination with a final pass can be considered as a single encoding pass and one retrial pass can be considered as a single encoding pass. As further described below, an encoding pass includes a number of steps that are selectively performed (i.e., certain of the steps are performed during a particular encoding pass and certain of the steps are not performed). One or more of these steps may be represented as two or more first-order sub-steps; one or more first order sub-steps may be represented as two or more second-order sub-steps and so on. Each step and sub-step represents a video encoding procedure in a particular encoding pass.

Figure 3:
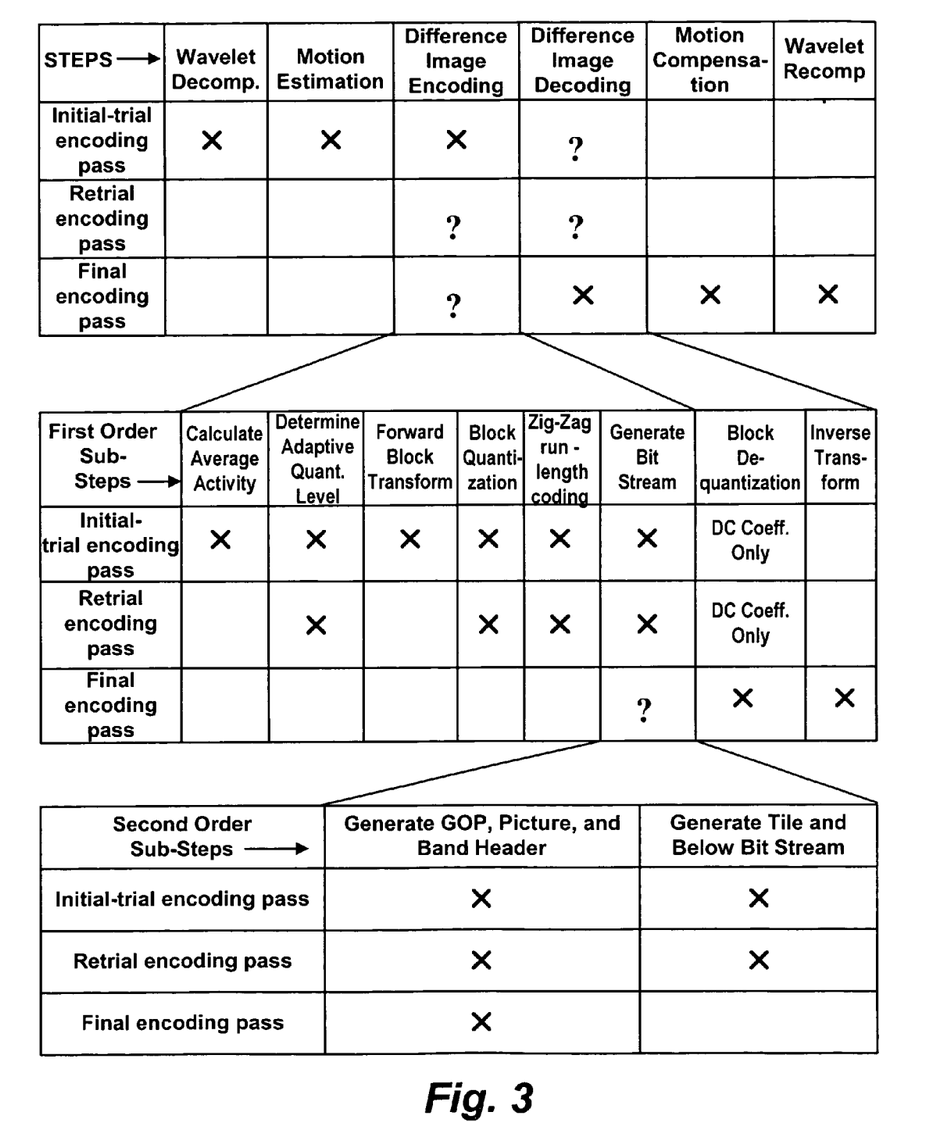
FIG. 3 is a diagram showing the relationship of steps and sub-steps for an example of a video encoding procedure.

Referring to FIG. 3, a diagram of the steps and sub-steps that may be performed in a plurality of types of encoding passes is shown. According to a method of the present invention, a systematic approach is taken to determine which sub-steps are necessary for each of the encoding passes. In this example, a sub-step is necessary if its execution is dependent on the quantization parameter (a value that is typically changed before performing a retrial encoding pass). As seen in FIG. 3, wavelet decomposition is a first step that is performed during an initial trial encoding pass. The "x" in that area indicates that the step is necessary to be performed for that encoding pass. Accordingly, motion estimation and difference image encoding are also necessary steps that are performed during an initial trial encoding pass.

For the retrial encoding pass, wavelet decomposition and motion estimation are steps that are not necessary to be performed and are often excluded during this pass. Because the final encoding pass is complimentary to the initial trial encoding pass, it is expected that these same two steps are not performed during the final encoding pass.

The difference image encoding pass step comprises a number of first order sub-steps. In the prior art, the entire difference image encoding step (i.e., all of its component sub-steps) are performed for the initial-trial, retrial and final encoding passes. According to a method of the present invention, it is determined whether each first order sub-step is necessary for a given encoding pass. If it is, then that sub-step is executed, if it is not, then that sub-step is skipped resulting in a reduction in the amount of time required to complete a given encoding pass. Referring back to FIG. 3, the first order sub-steps for the initial-trial, retrial and final encoding passes are shown. The difference encoding step includes the following six sub-steps: calculate average activity, determine adaptive quantization level, perform a forward block transform, perform a block quantization, zig-zag runlength coding, and generation of the bit stream. As indicated by the x under difference image encoding with the initial-trial encoding pass, each of the sub-steps for this step are necessary and are marked with x's.

For the retrial encoding pass, the difference image encoding step is marked with a "?" indicating that not all of the first order sub-steps are necessary for execution of this encoding step. In the sub-steps of the difference image encoding step, only four of the sub-steps are necessary. Accordingly, with an embodiment of the present invention, the calculate average activity and forward block transform steps are not performed, saving time during each retrial encoding pass. With the final encoding pass, none of the sub-steps are necessary except for the generate bit stream sub-step. As indicated in FIG. 3, this sub-step is made up of a number of second order sub-steps (i.e., generate group of pictures (GOP), picture and band header as well as generate tile and below bit stream). According to the method of the present invention it is determined that only the first of these second order sub-steps are necessary while the other is not. Rather than perform both sub-steps, only the first of these is performed according to an embodiment of the present invention.

As indicated in FIG. 3, the difference image decoding step includes a plurality of sub-steps (i.e., block dequantization and inverse transform). For the initial-trial and retrial encoding steps, the block dequantization sub-step is necessary while the inverse transform step is not. According to an embodiment of the present invention, only the block dequantization sub-step is performed using the DC (direct current) coefficient only. Both sub-steps are performed in the final encoding pass.

Figure 4:
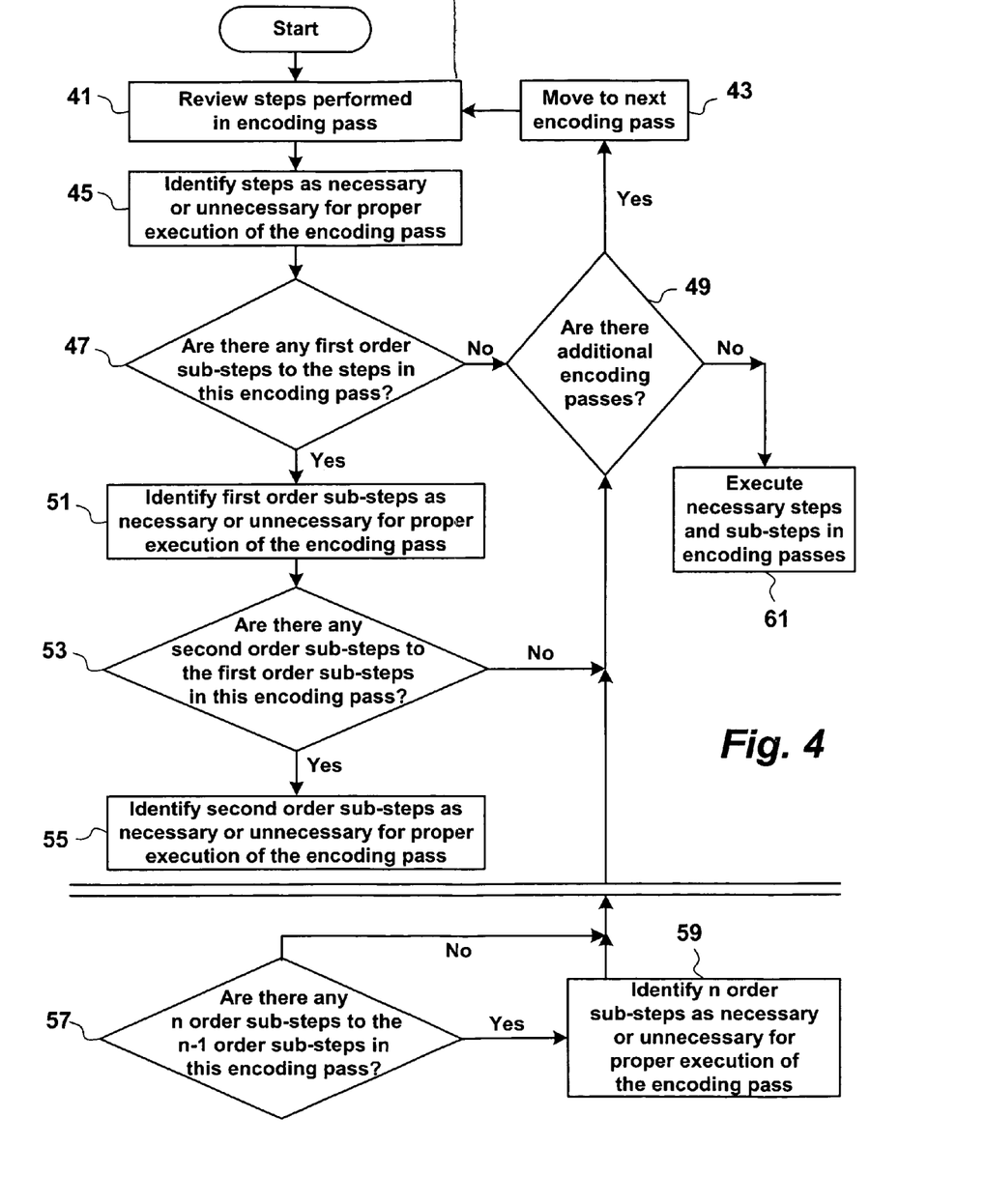
FIG. 4 is a flow diagram of an embodiment of the method of the present invention.

An embodiment of the method of the present invention is shown in FIG. 4. In step 41, a review is made of the steps of a first encoding pass. In step 45, an identification is made of those steps that are necessary and those that are unnecessary for the first encoding pass. In decision block 47, it is determined whether there are any first order sub-steps to the steps in the first encoding pass. If there are, then control passes to step 51 for identification of first order sub-steps that are necessary or unnecessary for proper execution of the encoding pass. In this embodiment of the present invention, a step or sub-step can be identified as necessary by setting a flag associated with that set of code in a separate table, removal of that set of code from the system, etc. If there are no first order sub-steps to the steps in the first encoding pass, then control passes to decision block 49 to determine if there is an additional encoding pass to be performed (e.g., a retrial encoding pass). If there is, then control passes to step 43 to move the analysis to the next encoding pass.

After the first order-sub steps are identified as necessary or unnecessary in step 51, control passes to decision block 53 to determine if there are any second order sub-steps to the first order sub-steps of the encoding pass. If there are, then control passes to step 55 where the second order sub-steps are identified as necessary or unnecessary for the proper execution of the encoding pass. If there are not, control passes back to decision block 49. The process can be continued for as many levels of sub-steps that appear in the encoding pass. For example, in decision block 57 it is determined whether there are any n order sub-steps to the n−1 order sub-steps in the encoding pass (where n is an integer greater than or equal to 3). If there are, then control passes to step 59 where n order sub-steps are identified as necessary or unnecessary for proper execution of the encoding pass.

Once the steps and sub-steps are identified as being necessary or unnecessary for proper execution of each encoding pass, the necessary steps and sub-steps in encoding passes are executed (see step 61 in FIG. 4). In this embodiment of the present invention, a step or sub-step can be identified as necessary by setting a flag associated with that set of code in a separate table. Accordingly, in this embodiment, when the encoding pass is executed, only steps and sub-steps that have a set flag are executed in the encoding passes. This can result in a quicker execution of the encoding passes, making the processing of video data more efficient. If there is a limited amount of time available to prepare a video frame of data, the present invention may allow an increased number of encoding passes to be performed, thus improving performance.

Referring to FIGS. 5 and 6a–c, flowcharts are presented showing the performance of encoding passes using an embodiment of the present invention. In step 101, an initial trial pass is performed with an initial quantization parameter $q_0$. In decision block 103, it is determined if any exit criteria have been met. Examples of exit criteria include: 1) whether the current bit rate matches a target bit rate (within a tolerance range); 2) whether the number of retrial encoding passes has exceeded a certain predetermined threshold; 3) whether the amount of time available for encoding a given video frame has expired; and 4) whether the quantization parameter can no longer be modified (e.g., it is set to the value of 0 and the encoding algorithm calls for a lower value). If the exit criteria is not met, control passes to step 105 where the quantization parameter $q_{i+1}$ is adjusted based upon $q_i$ and the data rate. Then in step 107, a retrial encoding pass is performed with the quantization parameter $q_{i+1}$. When the exit criteria is met, control passes to step 109, where the final encoding pass is performed.

Figure 5:
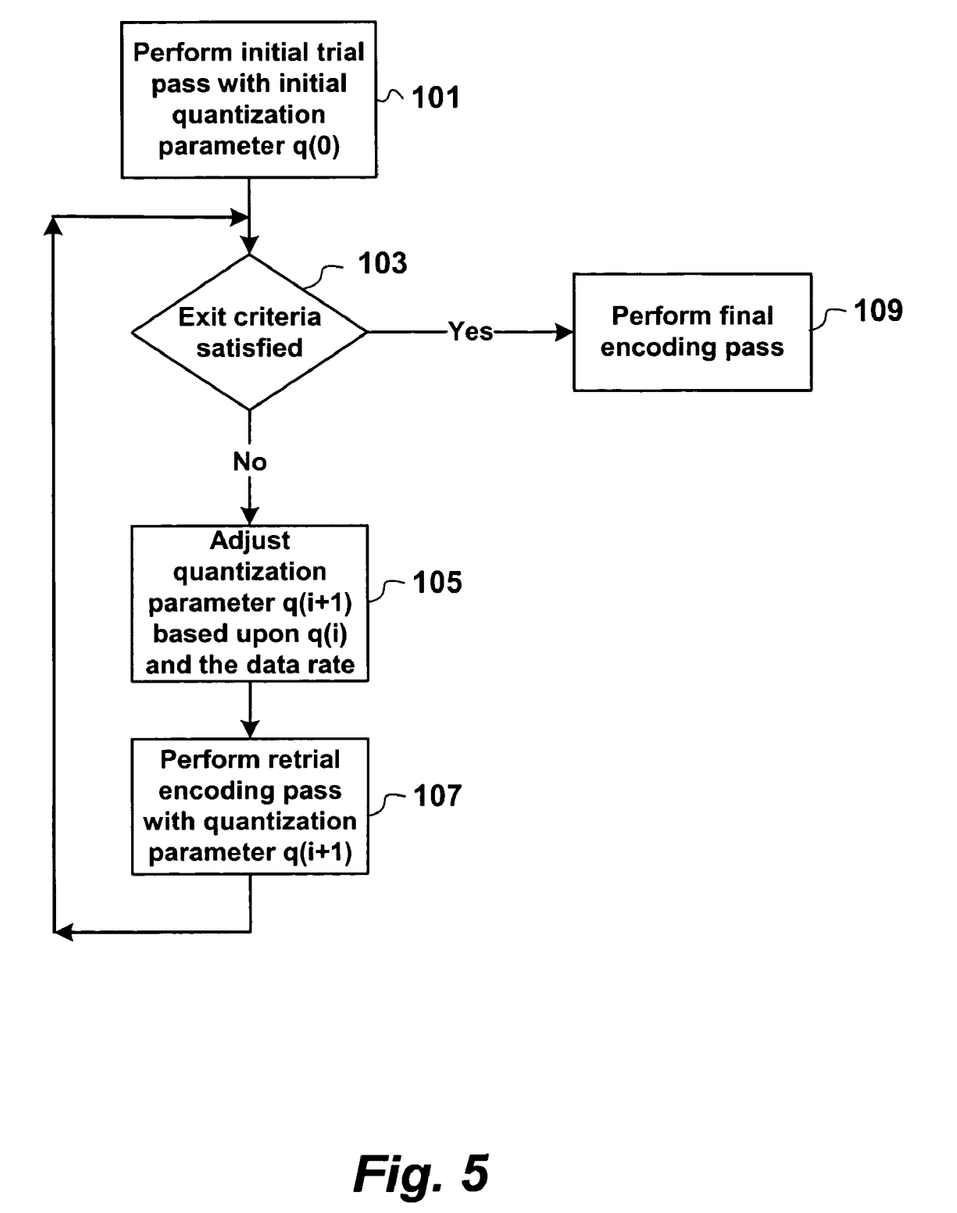
FIG. 5 is a flow diagram of the execution of the video encoding procedure determined according to the method of FIG. 4.
Figure 6A:
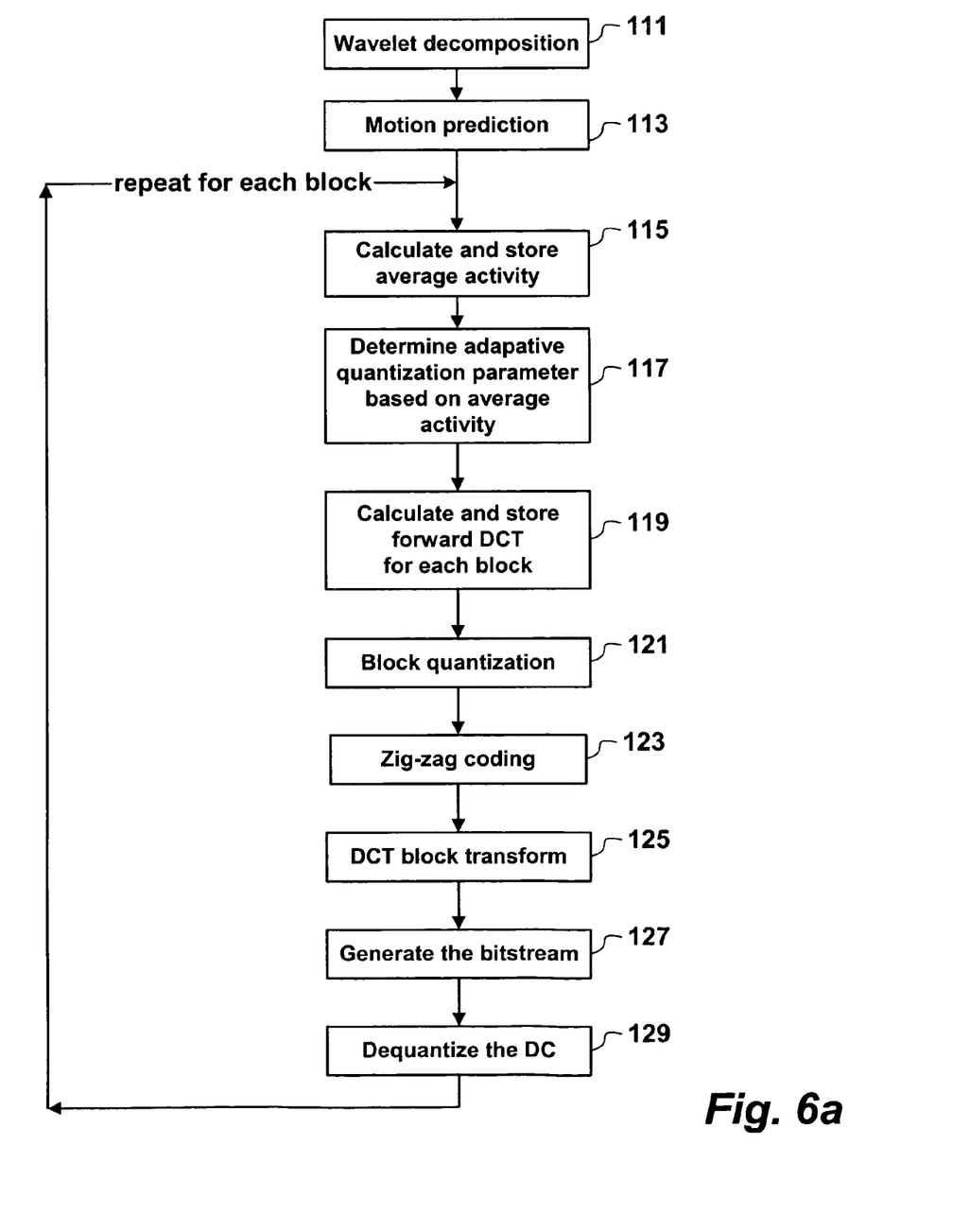
FIGS. 6a–c are more detailed flow diagrams of the method of FIG. 5.
Figure 6B:
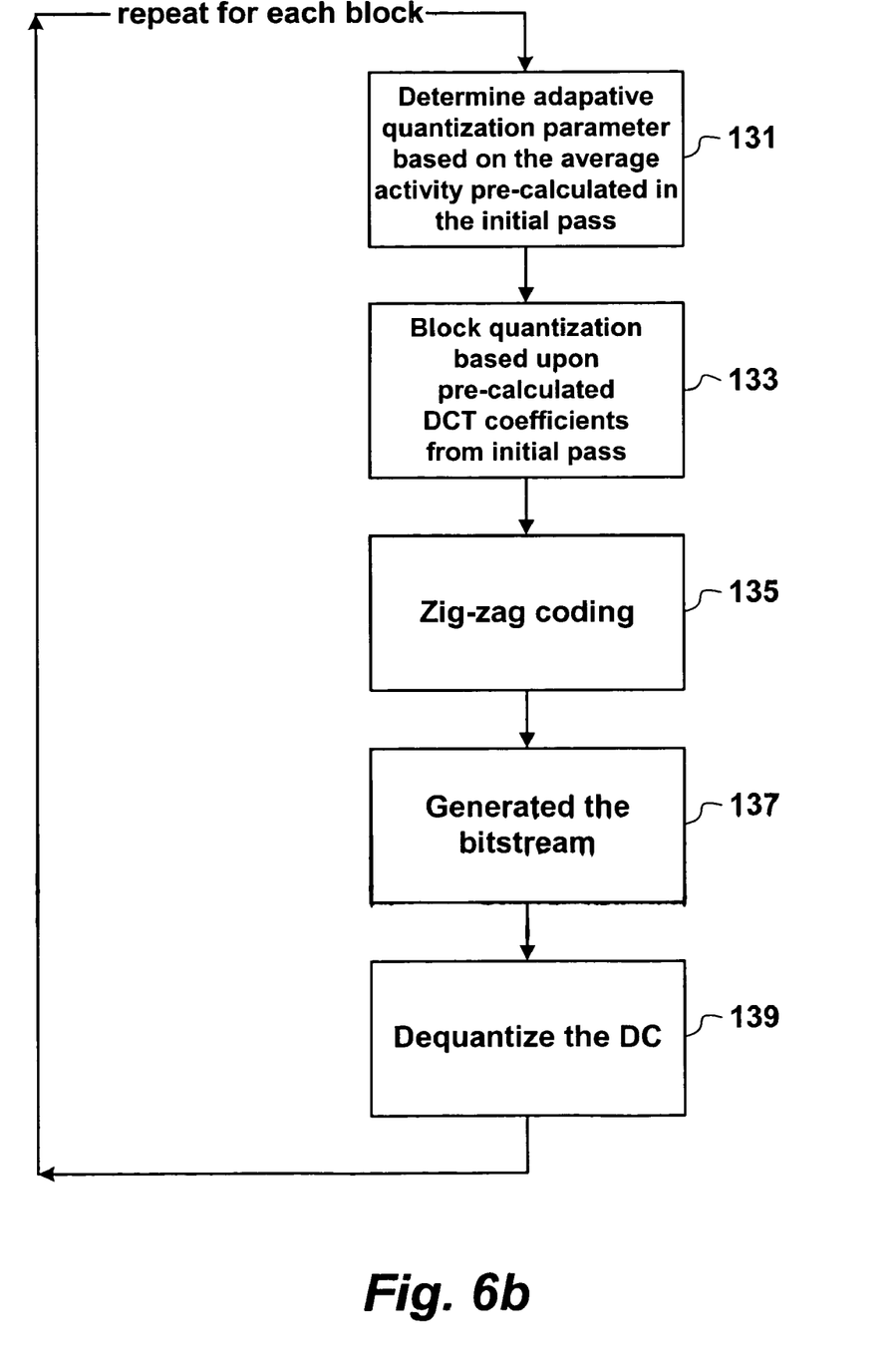
Figure 6C:
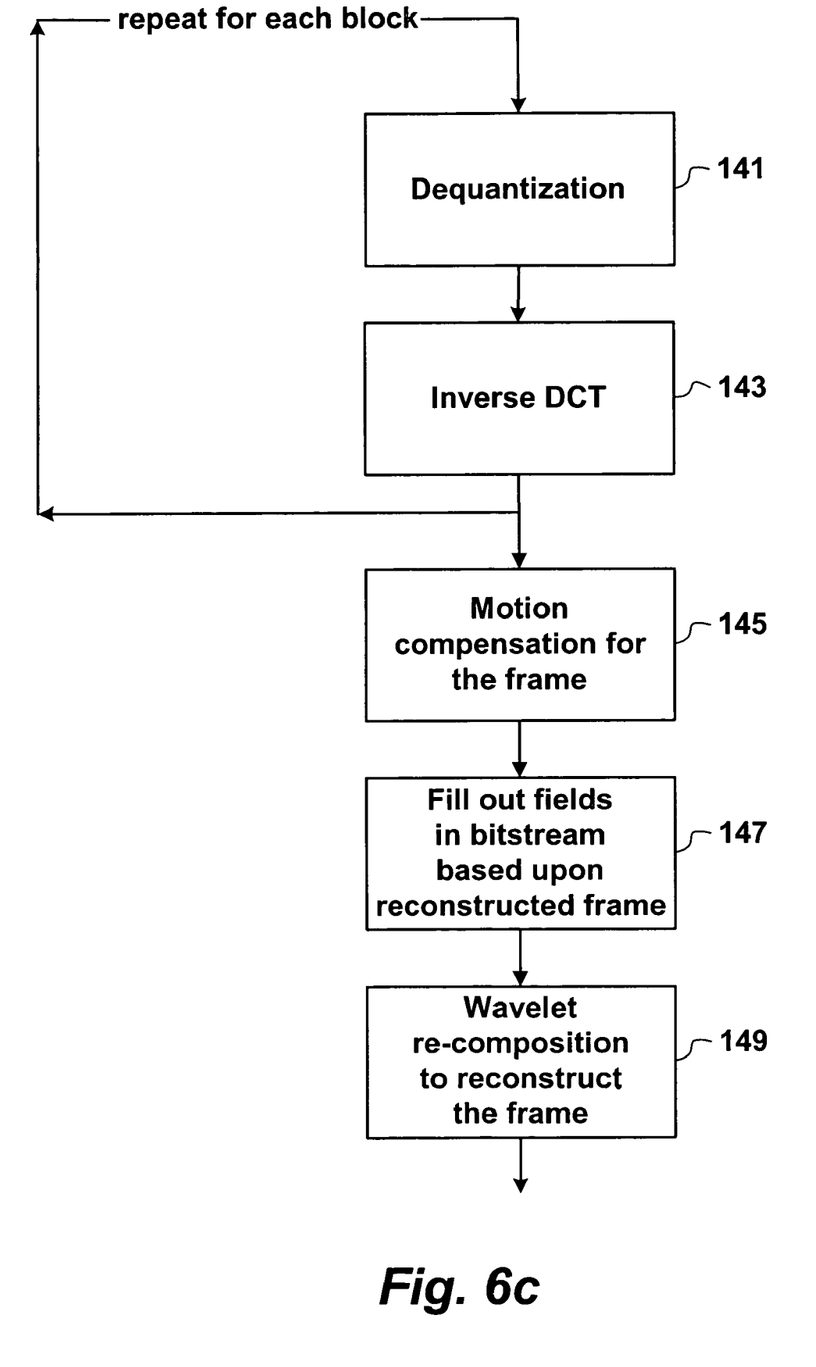

A more detailed flow chart for FIG. 5 is shown in FIGS. 6a–c according to an embodiment of the present invention. In FIG. 6a, a flowchart for an initial trial encoding pass is shown. In step 111, a wavelet decomposition operation is performed (e.g., dividing a video frame into a plurality of smaller sub-frames). Then in step 113, motion prediction is performed on the individual sub-frames (e.g., estimating direction and amount of motion based on current and previous sub-frames). In step 115, the average activity for each sub-frames is calculated and stored. Based on this average activity, the quantization parameter is determined (step 117). In step 119, the forward DCT (discrete cosine transform) is calculated and stored for a block (e.g., 16×16 picture elements) of a sub-frame. In step 121, a block quantization operation is performed using the term $q_0$. In step 123, zig-zag coding is performed (e.g., video image data is encoding in diagonal directions across the block). In step 125, a DCT block transform is performed for the block and in step 127, the bitstream is generated with the results of the block transform operations. In step 129, the DC coefficient is dequantized as the only sub-step performed for the difference image decoding step (FIG. 3). Steps 115–29 can be repeated for each block of the video frame.

Referring to FIG. 6b, a flowchart of a retrial encoding pass is shown. In step 131, an adaptive quantization parameter (e.g., $q_{i+1}$) is determined based on the average activity pre-calculated in the initial trial pass. In step 133, a block quantization is performed using the quantization parameter of step 131 upon pre-calculated DCT coefficients from the initial trial encoding pass. In steps 135 and 137, zig-zag coding is performed and the bitstream is generated, respectively. According to an embodiment of the present invention, steps 131–37 are the only sub-steps of the difference image encoding step (FIG. 3) that are performed in the retrial encoding pass (because these sub-steps were identified previously as being necessary). In step 139, the DC coefficient is dequantized as the only sub-step of the difference image decoding step that is performed during this pass. Steps 131–39 can be repeated for each block.

Referring to FIG. 6c, a flowchart of a final encoding pass is shown. In steps 141 and 143, the entire difference image decoding step (FIG. 3) is performed (i.e., block dequantization and DCT inverse transform, respectively). In step 145, a motion compensation operation is performed for the video frame. In step 147, fields in the bitstream are filled out (e.g., the GOP, picture, and band header information) as the only second order sub-step performed for the "generate bitstream" sub-step (FIG. 3). In step 149, a wavelet recompensation procedure is performed to reconstruct the video frame.

In comparing the procedural steps that are performed in FIGS. 6a–c and the steps and sub-steps that are typically performed in FIG. 3, a reduction in the amount of processing time for each encoding pass can be achieved.

Although embodiments are specifically illustrated and described herein, it will be appreciated that modifications and variations of the present invention are covered by the above teachings and within the purview of the appended claims without departing from the spirit and intended scope of the invention. For example, many steps of the method of the present invention 110 can be stored on a storage medium as executable code that is executed by a processor or the like. Also, one skilled in the art will appreciate that many of the method steps that are shown can be implemented using hardware components in addition to or instead of the execution of software code.

What is claimed is:

1. In a system for encoding a frame of video image data with at least first and second encoding passes of said video image data, where the second encoding pass on said frame of video data is performed after the first encoding pass is performed on said frame of video data and each encoding pass includes a number of executable steps and at least one of said executable steps includes a number of executable first order sub-steps, a method for encoding video image data comprising:

(a) identifying first order sub-steps in at least one of said first and second encoding passes as being necessary or unnecessary for execution of said encoding passes;

(b) executing said necessary sub-steps during said first and second encoding passes; and (c) excluding at least one sub-step from execution during an encoding pass for which that sub-step is unnecessary.

2. The method of claim 1 wherein in said identifying step, all of said first order sub-steps in said first and second encoding passes are identified as being necessary or unnecessary for execution of said encoding passes.

3. The method of claim 1 wherein at least one of said first order sub-steps includes a plurality of executable second order sub-steps, wherein after (a), said method further comprising:

($a_2$) identifying second order sub-steps in at least one of said first and second encoding passes as being necessary or unnecessary for execution of said encoding passes.

4. The method of claim 3 wherein in ($a_2$), all of said second order sub-steps in said first and second encoding passes are identified as being necessary or unnecessary for execution of said encoding passes.

5. The method of claim 3 wherein at least one of said executable first order sub-steps includes a plurality of n−1 order sub-steps and at least one of said n−1 order sub-steps includes a plurality of executable n order sub-steps where n is an integer greater than or equal to three, wherein after ($a_2$), said method further comprising:
   ($a_n$) identifying n−1 order sub-steps in at least one of said first and second encoding passes as being necessary or unnecessary for execution of said encoding passes.

6. The method of claim 5 wherein in ($a_n$), all of said n order sub-steps in said first and second encoding passes are identified as being necessary or unnecessary for execution of said encoding passes.

7. A set of instructions residing in a storage medium, said set of instructions capable of being executed by a processor to implement a method for encoding a frame of video image data with at least first and second encoding passes of said frame of video image data, where the second encoding pass on said frame of video data is performed after the first encoding pass is performed on said frame of video data and each encoding pass includes a number of executable steps and at least one of said executable steps includes a number of executable first order sub-steps, such that first order sub-steps in at least one of said first and second encoding passes are identified as being necessary or unnecessary for execution of said encoding passes, the method comprising:
   (a) executing said necessary sub-steps during said first and second encoding passes; and
   (b) excluding at least one sub-step from execution during an encoding pass for which that sub-step is unnecessary.

8. The set of instructions of claim 7, wherein in while identifying, all of said first order sub-steps in said first and second encoding passes are identified as being necessary or unnecessary for execution of said encoding passes.

9. The set of instructions of claim 7, wherein at least one of said first order sub-steps includes a plurality of executable second order sub-steps, wherein second order sub-steps in at least one of said first and second encoding passes are identified as being necessary or unnecessary for execution of said encoding passes.

10. The set of instructions of claim 9, wherein all of said second order sub-steps in said first and second encoding passes are identified as being necessary or unnecessary for execution of said encoding passes.

11. The set of instructions of claim 7, wherein at least one of said executable first order sub-steps includes a plurality of n−1 order sub-steps and at least one of said n−1 order sub-steps includes a plurality of executable n order sub-steps where n is greater than or equal to three, wherein n−1 order sub-steps in at least one of said first and second encoding passes are identified as being necessary or unnecessary for execution of said encoding passes.

12. The set of instructions of claim 11, wherein all of said n order sub-steps in said first and second encoding passes are identified as being necessary or unnecessary for execution of said encoding passes.

13. A system for a frame of encoding video image data with at least first and second encoding passes of said frame of video image data, where the second encoding pass on said frame of video data is performed after the first encoding pass is performed on said frame of video data and each encoding pass includes a number of executable steps and at least one of said executable steps includes a number of executable first order sub-steps, said first order sub-steps in at least one of said first and second encoding passes being identified as necessary or unnecessary for execution of said encoding passes, said system including:
   a video compressor adapted to encode video image data during said at least first and second encoding passes; and
   a bit rate controller coupled to said video compressor and adapted to control said video compressor during said at least first and second encoding passes, such that said video compressor is adapted to execute said necessary sub-steps during said first and second encoding passes and exclude at least one sub-step from execution during an encoding pass for which that sub-step is unnecessary.

14. The system of claim 13 wherein said video compressor further comprises:
   an encoder/decoder adapted to encode video image data during said at least first and second encoding passes.

15. The system of claim 14 wherein all of said first order sub-steps in said first and second encoding passes are identified as being necessary or unnecessary.

16. The system of claim 15 wherein at least one of said first order sub-steps includes a plurality of executable second order sub-steps and said second order sub-steps are identified as necessary or unnecessary.

17. The system of claim 15 wherein all of said second order sub-steps in said first and second encoding passes are identified as being necessary or unnecessary.

18. The system of claim 16, wherein at least one of said executable first order sub-steps includes a plurality of n−1 order sub-steps and at least one of said n−1 order sub-steps includes a plurality of executable n order sub-steps where n is an integer greater than or equal to three, and n−1 order sub-steps are identified in at least one of said first and second encoding passes as being necessary or unnecessary.

19. The system of claim 18 wherein all of said n order sub-steps in said first and second encoding passes are identified as being necessary or unnecessary.

20. In a system for encoding a quantity of video image data with at least first and second encoding passes of said quantity of video image data, where the second encoding pass on said frame of video data is performed after the first encoding pass is performed on said quantity of video data and each encoding pass includes a number of executable steps and at least one of said executable steps includes a number of executable first order sub-steps, a method for encoding video image data comprising:
   (a) identifying first order sub-steps in at least one of said first and second encoding passes as being necessary or unnecessary for execution of said encoding passes;
   (b) executing said necessary sub-steps during said first and second encoding passes; and
   (c) excluding at least one sub-step from execution during an encoding pass for which that sub-step is unnecessary.

21. The method of claim 20 wherein in said identifying step, all of said first order sub-steps in said first and second encoding passes are identified as being necessary or unnecessary for execution of said encoding passes.

22. The method of claim 20 wherein at least one of said first order sub-steps includes a plurality of executable second order sub-steps, wherein after (a), said method further comprising:

($a_2$) identifying second order sub-steps in at least one of said first and second encoding passes as being necessary or unnecessary for execution of said encoding passes.

23. The method of claim 22 wherein in ($a_2$), all of said second order sub-steps in said first and second encoding passes are identified as being necessary or unnecessary for execution of said encoding passes.

24. The method of claim 22 wherein at least one of said executable first order sub-steps includes a plurality of n–1 order sub-steps and at least one of said n–1 order sub-steps includes a plurality of executable n order sub-steps where n is an integer greater than or equal to three, wherein after ($a_2$), said method further comprising:

($a_n$) identifying n–1 order sub-steps in at least one of said first and second encoding passes as being necessary or unnecessary for execution of said encoding passes.

25. The method of claim 24 wherein in ($a_n$), all of said n order sub-steps in said first and second encoding passes are identified as being necessary or unnecessary for execution of said encoding passes.

* * * * *

UNITED STATES PATENT AND TRADEMARK OFFICE
CERTIFICATE OF CORRECTION

| | | |
|---|---|---|
| PATENT NO. | : 7,130,349 B1 | Page 1 of 1 |
| APPLICATION NO. | : 09/116147 | |
| DATED | : October 31, 2006 | |
| INVENTOR(S) | : Liuyang Yang | |

It is certified that error appears in the above-identified patent and that said Letters Patent is hereby corrected as shown below:

In column 6, at line 31, after "invention" delete "110".

Signed and Sealed this

Tenth Day of April, 2007

JON W. DUDAS
*Director of the United States Patent and Trademark Office*